United States Patent [19]
Chu et al.

[11] Patent Number: 5,726,512
[45] Date of Patent: Mar. 10, 1998

[54] VIBRATION-FREE LEVITATED PLATFORM

[75] Inventors: Wei-Kan Chu, Pearland; Quark Yung-Sung Chen; Ki-Bui Ma, both of Houston, all of Tex.; Mark Alan Lamb, Tempe, Ariz.; Chase Kenyon McMichael, Houston, Tex.; Ignatius S. T. Tsong, Tempe, Ariz.

[73] Assignee: The University of Houston System, Houston, Tex.

[21] Appl. No.: 726,147

[22] Filed: Oct. 4, 1996

[51] Int. Cl.⁶ .................. B60L 13/04; H02K 7/09
[52] U.S. Cl. .................. 310/90.5; 335/216; 505/876; 505/878
[58] Field of Search ................ 335/216; 310/90.5; 505/877, 878, 876, 903, 879

[56] References Cited

FOREIGN PATENT DOCUMENTS

4027696  1/1992  Japan.

*Primary Examiner*—Michael L. Gellner
*Assistant Examiner*—Raymond Barrera
*Attorney, Agent, or Firm*—J. M. (Mark) Gilbreth; Robert W. Strozier; Gilbreth & Strozier, PC.

[57] ABSTRACT

An isolation system for isolating a first object from vibrations from a second object. Such vibrations will have three orthogonal components, one oriented along a line between the objects, and two oriented 90° apart in a plane normal to that line. The system includes three superconductor/magnet stages, each stage designed to extinguish one of the orthogonal components.

4 Claims, 10 Drawing Sheets

VIBRATION-FREE LEVITATED PLATFORM

STATEMENT REGARDING GOVERNMENT FUNDING

The United States Government owns certain rights to this invention pursuant to one or more grants, including grant number DAAL 03-92-G-0038 from the United States Army Research Office.

BACKGROUND OF THE INVENTION

1. Field of the Invention

The present invention relates to isolation systems and to the isolation of equipment from vibrations. In another aspect, the present invention relates to isolation systems utilizing magnets, and to the isolation of equipment from vibrations utilizing magnets. In even another aspect, the present invention relates to isolation systems utilizing magnets and superconductors, and to the isolation of equipment from vibrations utilizing magnets and superconductors.

2. Description of the Related Art

Many types of prior art devices exist for controlling or infuencing relative motion between two or more bodies. For example, vibration damping systems, brakes and clutches are well known and generally utilize mechanical type of apparatus that are subject to wear, noise, vibration and friction heating problems. These problems can often lead to seizure or other failure of the apparatus. For example, springs or shock absorbers utilized in conventional vibrational control systems tend to wear out with repeated usage over time. Brake pads and mechanical clutches ultimately wear out, and have to be periodically replaced. In addition, mechanical systems often require lubricants which fail in severe environments such as those commonly encountered in outer space. Failure of conventional liquid lubricants in outer space is usually due to the vacuum conditions that cause the lubricants to outgas or vaporize, leaving contact surfaces dry and resulting in the ultimate failure of the apparatus. Additionally, in outer space temperatures are very low so most lubricants solidify and simply do not function as lubricants.

As an alternative to mechanical systems for controlling or influencing motion, magnetic systems have been developed. Conventional magnetic systems for controlling or influencing motion are generally unstable and require for their operability, control means, such as rapidly acting feedback control systems, to compensate for displacements from the set point. Until recently, such magnetic systems have utilized magnets of two types-either permanent magnets or electromagnets.

Because field strength of permanent magnets is generally limited, the use of permanents magnets is limited to applications where very small forces are adequate. Electromagnets, which can supply considerably more magnetic force than comparable permanent magnets, are much more convenient to use and are thus preferred for use in conjunction with feedback control systems. However, because of the required feedback control systems, use of electromagnets adds considerably to the cost, size, and operational complexity of the system.

It has been appreciated for years that magnetic fields strongly interact with superconducting materials. The most distinctive property of a superconductive material is its loss of electrical resistance when it is at or below a critical temperature. This critical temperature is an intrinsic property of the material and is referred to as the superconducting transition temperature of the material, $T_c$.

There have been recent advances in superconducting materials and parallel advancements in the field of permanent magnets. Superconductive materials are of two basic types, designated as Type I and Type II. Unlike Type II superconductors, Type I superconductors are incapable of effecting stable suspension.

Type I superconductors feature perfect diamagnetism up to a critical applied field, at which point superconductivity is lost and the magnetization of the sample abruptly disappears. Examples of applications of Type I materials can be found in U.S. Pat. Nos. 3,493,274 and 3,026,151, which disclose a bearing utilizing Type I materials. In order to achieve stability in these systems, the bearing structures must rely on either a mechanical rotary support or must employ superconductors shaped to provide a laterally stable configuration.

The recent discoveries of high temperature superconductors involve Type II materials. Whereas a Type I superconductor completely blocks out magnetic flux from its interior, a phenomenon known as diamagnetism, Type II superconductors allow a certain amount of magnetic flux to penetrate into the interior of the material, producing a stable suspension effect in addition to a levitation effect. Under such conditions, circulating superconducting currents are established within the superconductor.

Recent research activities have brought the discovery of "high temperature superconducting" (HTS) compounds. HTS compounds are those which superconduct at and below a critical temperature, $T_c$, which is above the boiling point temperature of nitrogen. Since they are superconductive at temperatures greater than 77° K, the new HTS superconductors may be cooled with liquid nitrogen, which is a far less costly refrigerant than liquid helium. As a result, the rather complex thermal insulation and helium-recycling systems, necessary to avoid wasting the expensive helium coolant required for the low temperature superconducting material previously known, are no longer necessary. The HTS compounds simplify and enhance the reliability of commercial applications of superconductors. Liquid nitrogen is about 2000 times more efficient to use in terms of cost, when both the refrigerant itself and the associated refrigerant unit design are considered.

A typical example of a system featuring a combination of Type II superconductors and permanent magnets is disclosed in U.S. Pat. No. 4,886,778, which discloses a rotating shaft having two ends, each of which contains a permanent magnet and rotates in a socket clad with superconducting material. The shaft is made to levitate above the sockets by the repulsive forces which exist between the magnets and the superconductors. The incorporation of superconductors into the bearing design offers the possibility of rendering the bearings entirely passive. The design disclosed in U.S. Pat. No. 4,886,778 has the potential for achieving very high rotational speeds, in excess of ten thousand rpm. The interaction between the rotating magnetic axial element and its stationary superconducting support takes place across a gap permeated by a strong magnetic field emanating from permanent magnets embedded in the rotating element.

However, while systems featuring Type II superconductors and magnets have been proposed for systems designed to perpetuate motion, such as bearings, these is a need for superconductor/magnet systems in vibrational isolation systems.

U.S. Pat. No. 5,542,506, issued Aug. 6, 1996 to McMichael et al. discloses a magnet-superconducting system for controlling and influencing relative motion. Michael et al. disclose that the relative motion of a superconductor and a complex magnetic configuration with respect to each other is quickly damped in a system in which the superconductor is arranged in close vicinity to the complex configuration of magnetic polarities so as to benefit most from its high magnetic field gradients. Thus, the movements of either the superconductor or the magnet is closely followed by the other.

However, there is a need for an improved vibrational isolation system.

There is another need for an improved vibrational isolation system utilizing a superconductor/magnet system.

These and other needs in the art will become apparent to those of skill in the art upon review of this specification, including its drawings and claims.

SUMMARY OF THE INVENTION

It is an object of the present invention to provide for an improved vibrational isolation system.

It is another object of the present invention to provide for an improved vibrational isolation system utilizing a superconductor/magnet system.

These and other objects of the present invention will become apparent to those of skill in the art upon review of this specification, including its drawings and claims.

According to one embodiment of the present invention there is provided an isolation system for isolating a first object from vibrations from a second object. Vibrations will include three orthogonal components, a first orthogonal component oriented along first line between the objects, and second and third orthogonal components oriented along second and third lines 90° apart in a plane normal to first. The isolation system will include a stage for each of the three orthogonal components.

Each stage will generally include a magnet member and superconductor member, with the magnet member comprising a magnet, and the superconductor member comprising a magnet and a superconductor. For each of the stages, the magnet member and the superconductor member are disjoined, magnetically interact, and are magnetically biased to freely move relative to each other only parallel to the line of the respective orthongonal component for that stage.

The three stages are arranged with one connected to the first object, one connected to the second object, and one connecting the two stages.

One of the three stages is selected as the first object connector and is connected to the first object by its magnet or superconductor member.

One of the two remaining stages is selected as the second object connector and is connected to the second object by its magnet member or superconductor member.

The remaining stage is selected as the intermediate stage to isolate the first object connector stage from the second object connector stage.

Wherein for at least one stage of the first stage, second stage or third stage, the magnet member comprises a plurality of magnets oriented such that their north-south pole axis are parallel; wherein the plurality of magnets for the at least one stage is positioned around the superconductor member for that stage; wherein for the at least one stage, the superconductor member magnet is oriented such that its north-south pole axis is parallel to the plurality of magnets.

DETAILED DESCRIPTION OF THE INVENTION

The present invention is directed to an isolation system and the construction of an isolation system for sensitive equipment. The present invention finds utility in isolating such equipment, as much as possible, from the effects of external vibrations which could degrade performance of the equipment.

In the present invention, at least one of either the superconductor or the complex magnet can be levitated with magnetic forces between magnets and flux pinning forces between the superconductor and magnets, and thus kept away from physical contact with the other and the remainder of the universe. Thus, vibrations cannot be transmitted to the object thus isolated, except via the very magnetic flux that connects the superconductor and the magnet, and other time varying forces that are capable of action at a distance.

In the present invention the stiffness and damping can be made to depend strongly on the direction of the vibration, by appropriate design of the complex magnetic configuration.

In an attempt to eliminate the effects of extraneous vibration on a piece of equipment, two opposite but complementary approaches are possible. The first is to attach the equipment to something that would not vibrate. The second is to decouple the equipment from anything that vibrates.

The present invention utilizes the second approach, that is, to decouple the equipment from anything that vibrates.

In the practice of the present invention, the sensitive equipment will be separated from physical contact with other objects by levitation. However, leviation alone, is generally not sufficient to achieve good vibration isolation. With stable levitation vibrations will still occur, ironically, because of the restoring forces that renders the levitation stable. Suitable isolation will require conversion of this stability into a partial directional marginal stability, in each of the three orthogonal directions, in successive stages.

Figure 1:
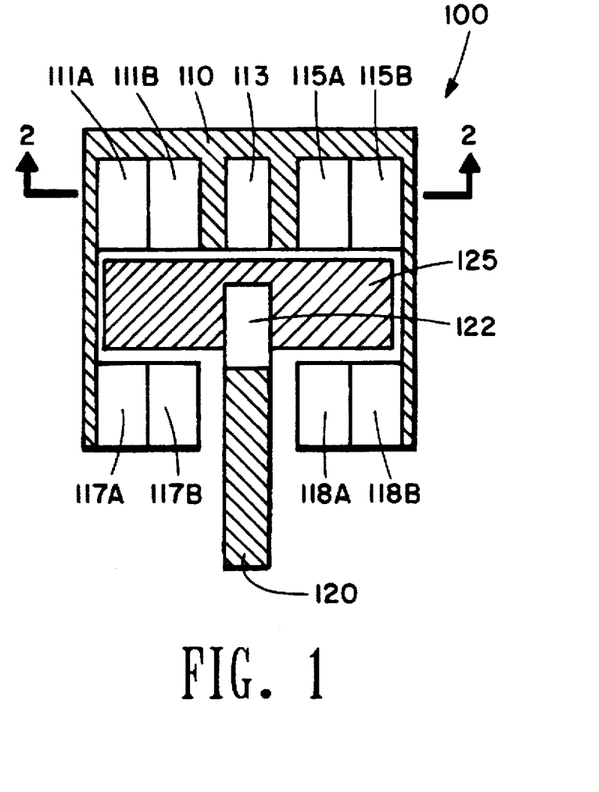
FIG. 1 a side view of levitation system 100 of the present invention showing isolated platform 110 and support member 120.
Figure 2:
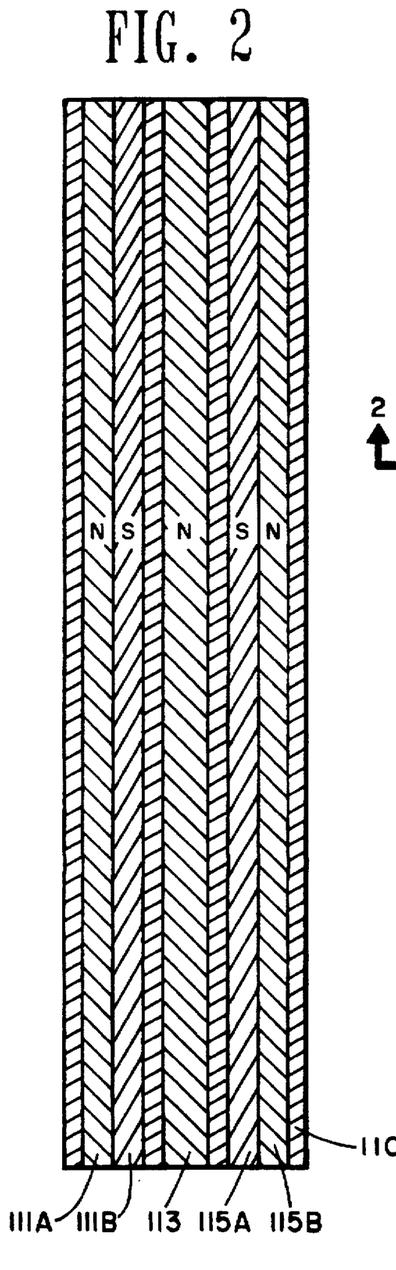
FIG. 2 is a top cutaway view of levitation system 100 of FIG. 1, taken at 2—2 of FIG. 1, and provides a view of platform center magnet 113, and platform outer magnets pair 111A and 111B, and platform out magnet pair 115A and 115B.

Referring now to FIG. 1, there is shown a side view of levitation system 100 with isolated platform 110 and support member 120. Support member 120 includes support magnet 122 and support HTS portion 125. Isolated platform 110 includes one or more parallelly arranged platform magnets 111A, 111B, 113, 115A, 115B, 117A, 117B, 118A and 118B, which provide a degree of freedom to allow relative movement between isolated platform 110 and support 120, in a direction parallel to these magnets. For example, referring additionally to FIG. 2, there is shown top cutaway view of system 100 of FIG. 1, taken at 2—2 of FIG. 1. FIG. 2 provides a view of platform center magnet 113, and platform outer magnets pair 111A and 111B, and platform out magnet pair 115A and 115B. These magnet pairs 111A and 111B, and 115A and 115B, are each a row of two or more magnets with alternating poles facing HTS material 125 so as to achieve high lateral gradients within and on the surface of HTS material 125.

The magnetic forces between platform magnet 113 and support magnet 122 magnetically interact to provide support for the weight of platform 110.

Levitation system 100 can also be used upside down as a suspension system, with platform magnet 113 and support magnet 122 attracting each other rather than repelling each other as shown in FIG. 1.

It is possible to alternatively provide HTS material on isolated platform 110, instead of on support 120, provided sufficient cooling is available to any HTS material on isolated platform 110.

Levitation system 100 shown in FIGS. 1 and 2, operates to suppress the transmission of vibrations in the direction in the lengths of the magnet bars 111A, 111B, 113, 115A and 115B, in a plane normal to the force between platform magnet magnet 113 and support magnet 122.

In the practice of the present invention, two or more of levitation systems 100 will be utilized in a multi-stage levitation system. Such a multi-stage levitation is utilized to minimize or eliminate (in a one out of three orthogonal components per stage manner) the transmission of vibration through the magnetic flux that links superconductor 125 to platform magnet 113 that is responsible for the levitation force itself. This is accomplished by arranging it so that the magnetic field from the magnet in the space occupied by the superconductor is unchanging in that one direction.

This vibration through the magnetic flux will have three orthogonal components, one oriented along a line between platform magnet 110 and support magnet 122, and two oriented 90° apart in a plane normal to that line. Each levitation stage is designed to extinguish the transmission of a component of the vibration in a plane normal to the steady levitating force between platform magnet 113 and support magnet 122. Thus, while two or more levitation systems 100 may be utilized in multiple stages, it is generally only necessary to utilize two such sytems 100, oriented 90 degrees apart, to extinguish to transmission of the two components of vibration in the normal plane.

Figure 3:
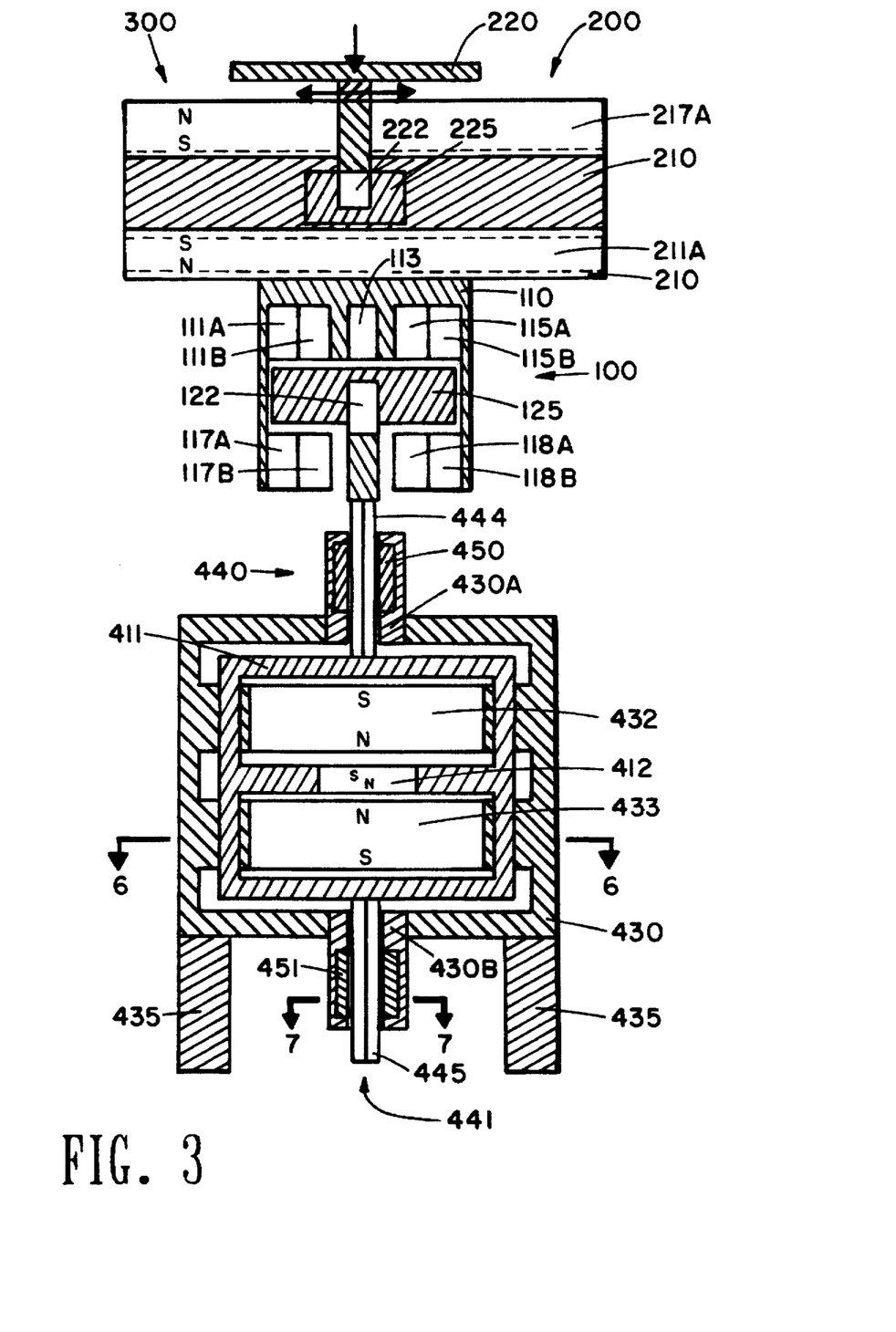
FIG. 3 is a schematic of a dual stage system 300 having stages 100 and stages 200.
Figure 4:
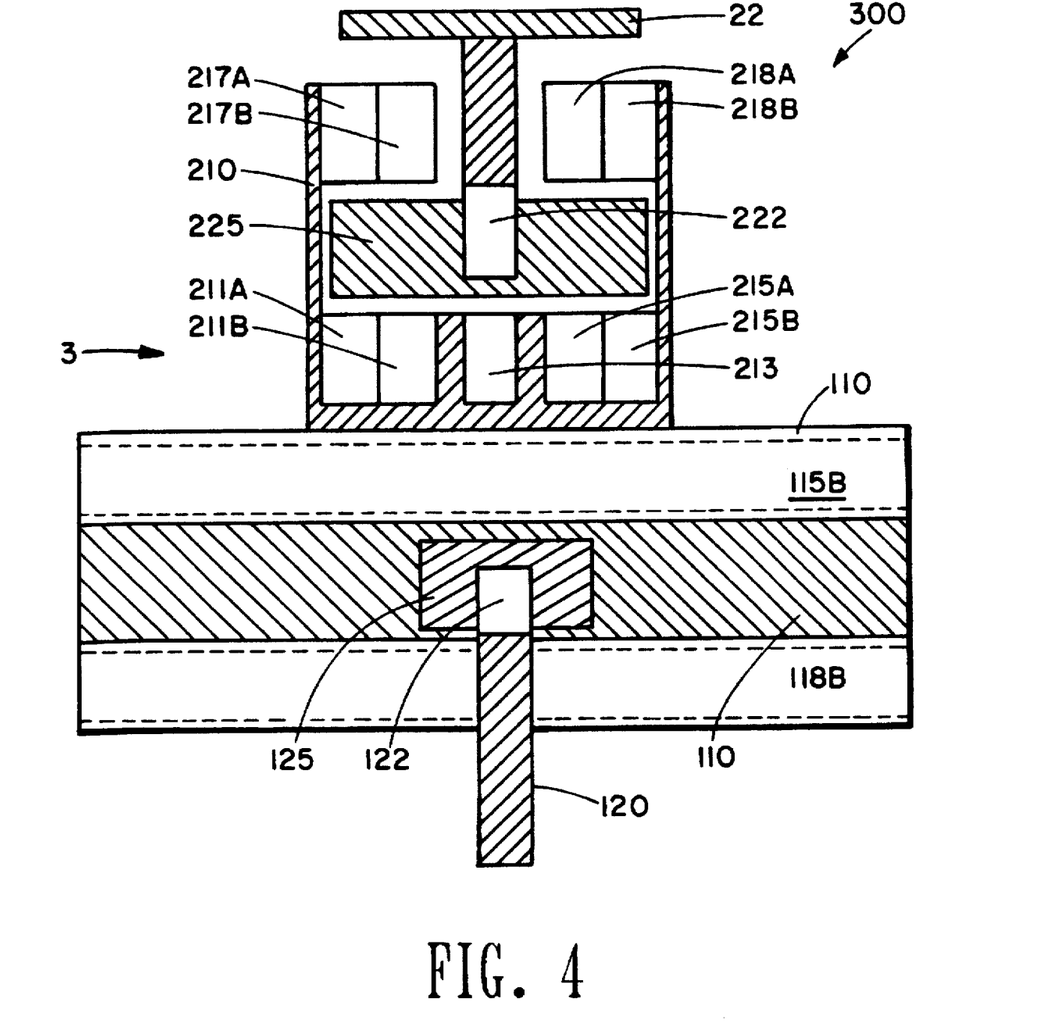
FIG. 4 is a side view of dual stage system 300 of FIG. 3.

A suitable non-limiting example of such a dual stage arrangement is illustrated in FIGS. 3 and 4, showing basically two identical systems 100 and 200, oriented at right angles on top of each other. System 200, in the top half of the FIG. 3 is actually the side view of the bottom half, so that if the entire system is rotated about a vertical axis by 90°, as shown in FIG. 4, the top half looks like what was the bottom half, and the bottom half becomes what was the top half. FIG. 4 shows system 300 of FIG. 3, as viewed from arrow 4 in FIG. 3, and FIG. 3 shows system 300 of FIG. 4, as viewed from arrow 3 in FIG. 4.

System 200 includes isolated platform 220 and support member 210. Isolated platform 220 includes support magnet 222 and support HTS portion 225. Suport member 210 includes one or more parallelly arranged platform magnets 211A, 211B, 213, 215A, 215B, 217A, 217B, 218A and 218B, which provide a degree of freedom to allow relative movement between isolated platform 220 and support member 210, in a direction parallel to these magnets.

Figure 5:
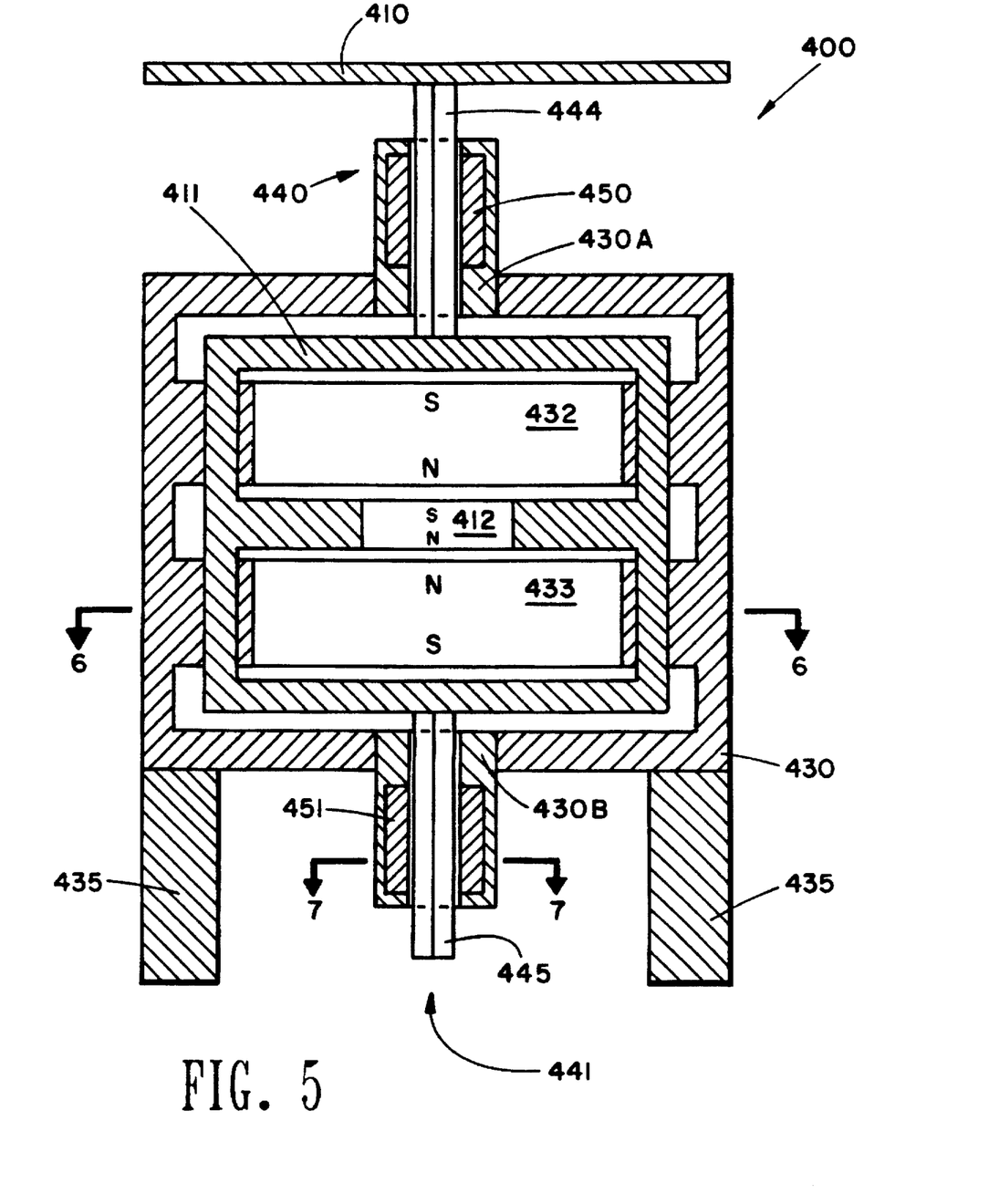
FIG. 5 is a schematic of vibration isolation system 400 including isolated platform 410 and frame 430.
Figures 6, 7:
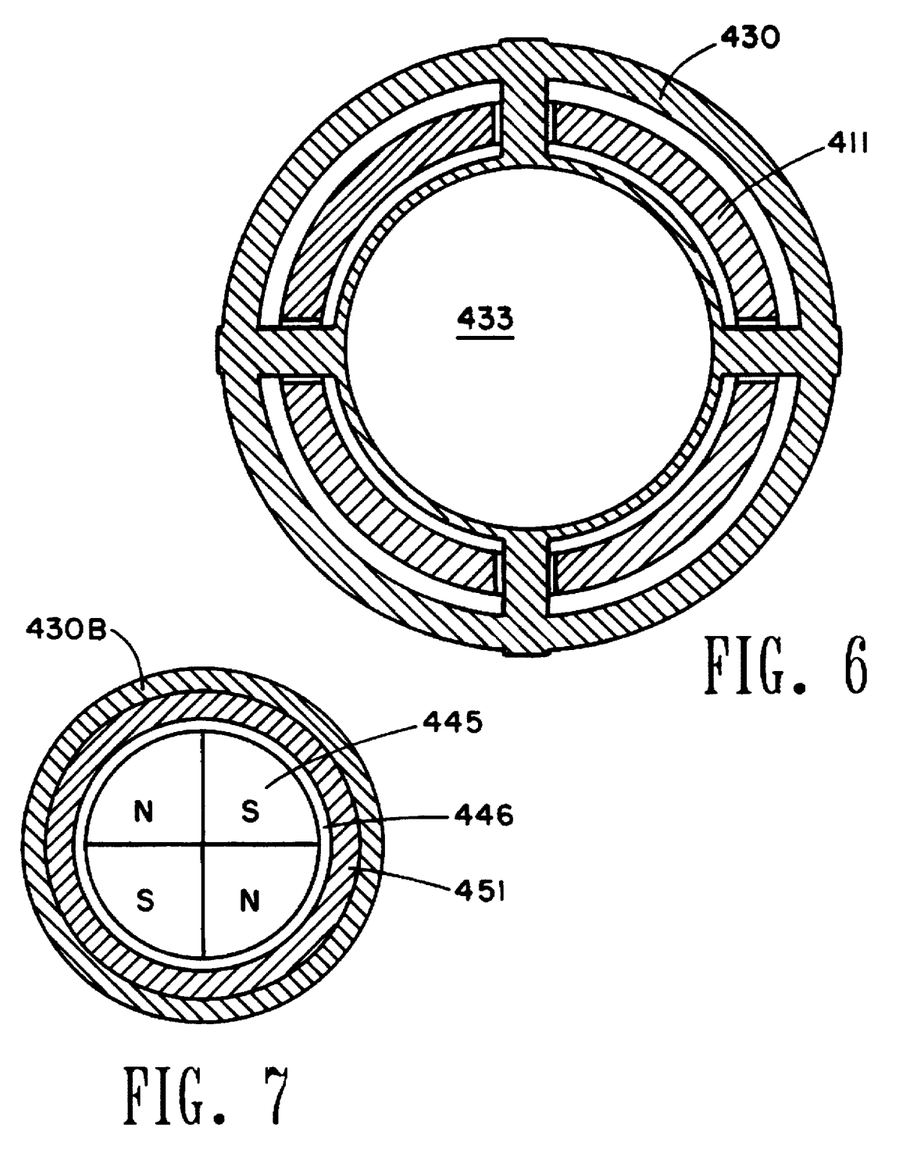
FIG. 6 is a view of vibration isolation system 400 of FIG. 5 taken at 6—6.
FIG. 7 is a view of vibration isolation system 400 of FIG. 5 taken at 7—7.

To suppress the transmission of the component of the vibration parallel to the levitating force itself, a stage must be provided that transmits this force without axial stiffness. One way to achieve this is to use a dipole magnet in a magnetic field with uniform axial gradient of the axial component of the field, supplemented by HTS materials to maintain overall stability. Referring now to FIGS. 5, 6 and 7 there is shown vibration isolation system 400 for isolating platform 410. This platform 410 includes an isolation framing 411 which supports magnet 412, and a grounded framing 430 with legs 435 which supports magnets 432 and 433.

The isolated platform 410 is supported via the thrust force between the dipole magnet 412 attached to platform 410 and magnet poles 432 and 433 producing uniform field gradient attached to frame 430. Vibrations in the vertical direction are not transmitted to isolated platform 410 if the uniform field gradient is perfectly uniform, and if quadrupole magnets 444 and 445 in the linear bearings 440 and 441 do not vary along the vertical direction. Linear bearings 440 and 441 are put in place to stabilize isolated platform 410 in the horizontal plane. These bearings 440 and 441 include housing 430A and 430B, quadrapole magnets 444 and 445, HTS members 450 and 451, respectively.

Any suitable HTS materials may be utilized in the practice of the present invention. Preferably, the HTS materials utilized in the practice of the present invention are 123 materials. Following the discovery of superconductivity in a rare earth-alkaline earth-Cu oxide system of a perovskite crystalline structure, a new class of rare earth-alkaline earth-copper oxides was discovered which are superconductive at temperatures above the boiling point of liquid nitrogen, 77° K. These new rare earth-alkaline earth-copper oxides are now commonly referred to as "123" high-temperature superconductors in reference to the stoichiometry in which the rare earth, alkaline earth, and copper metal atoms are present, namely a ratio of 1:2:3.

The 123 high temperature superconducting compounds have a perovskite related crystalline structure. The unit cell of such 123 compounds consists of three subcells in alignment along the crystallographic c-axis wherein the center of the middle subcell is occupied by a rare earth metal atom, the center of each end subcell is occupied by an alkaline earth metal atom, and copper atoms occupy the corner positions in each subcell. X-ray and neutron powder diffraction studies indicate the structure of superconductive 123 compounds to be oxygen deficient and that the ordering of oxygen in the basal planes is critical to the existence of superconducting properties in such compounds. See C. Poole et al, Copper Oxide Superconductors (John Wiley & Sons 1988).

The unit cell formula of the 123 compound is $L_1M_2CU_3O_{6+delta}$ (delta=0.1 to 1.0, preferably about 1.0) wherein the rare earth metal constituent, L, is yttrium, lanthanum, neodymium, samarium, europium, gadolinium, dysprosium, holmium, erbium, thulium, ytterbium, or lutetium, or mixtures thereof including mixtures with scandium, cerium, praseodymium, terbium and the alkaline earth constituent, M, is barium, strontium or mixtures thereof. Studies indicate that when delta is between about 0.1 to about 0.6, the resulting 123 compound assumes a tetragonal unit cell crystallographic symmetry and is nonsuperconductive. In the tetragonal unit cell symmetry, the lattice dimension of the c-axis is approximately 11.94 angstroms and that of the a and b axis are equal, approximately 3.9 angstroms. When delta is between 0.7 and 1.0, the resulting 123 compound has an orthorhombic unit cell crystallographic symmetry and is superconductive. The orientation of the oxygen atoms in the unit cell causes the unit cell to compress slightly along the a crystallographic axis and thus the lattice dimension of the a axis is less than that of the b axis. Lattice constants in the orthorhombic symmetry are about a=3.82, b=3.89 and c=11.55 angstroms.

To prepare the precursor composition from which the HTS compound will be prepared, any of the three commonly employed techniques may be used, namely the solid state, the coprecipitation, and the sol-gel techniques. A description of these techniques may be found in "Proceeding on the Symposium on High Temperature Superconducting Materials", University of North Carolina, Chapel Hill, N.C., W. E. Hatfield and J. H. Miller, Jr. (Eds.), M. Dekker, New York (1988), all herein incorporated by reference. An HTS material of sufficient critical current density, $J_c$, can be made by the methods disclosed in application Ser. No. 723,405, filed Jul. 1, 1991 by Wei-Kan Chu et al., entitled "Method for producing formed bodies of high temperature superconductors having high critical currents," herein incorporated by reference.

The HTS material utilized in the present invention is preferably melt-textured. Melt-texturing is a well known process for preparing HTS materials. In a melt-textured growth process for preparing bodies of $YBa_2Cu_3O_{6+delta}$, all portions of the entire body are simultaneously first elevated in temperature beyond the peritectic temperature of the compound to melt the 123 compound incongruently into $Y_2BaCuO_5$ and a liquid phase. Thereafter the body is allowed to cool, at a controlled rate (dT/dt), to a temperature below the solidus temperature wherein the $Y_2BaCuO_5$ and liquid phase react to reform the 123 compound which crystallizes. Non-limiting examples of melt-texturing methods suitable for use herein are described in Jin et al. in Appl. Phys. Lett., Vol. 52, pp. 2074–2076(1988) and Vol. 54, pp. 584–586 (1989); Murakami et al. in Jpn. J. Appl. Phys., Vol. 28, pp. L1125–1127 (1989); and Salama et al., Appl. Phys. Lett., vol. 54, pp. 2352–2354, all herein incorporated by reference.

In the practice of the present invention, it may be necessary to have an HTS compound fabricated into usable body shapes, such as plate, rod, wire, or ribbon, of large dimensions with controllable grain orientation and large $J_c$ to carry large total current loads. Although promising for 123 bodies of enhanced $J_c$, the melt textured growth techniques—since they require temperature programming of a furnace in which the entire body article is placed—possess a limitation to the size of the body produced, i.e., it cannot be greater than that of the furnace. Melt textured growth and liquid-phase techniques reported so far are limited to batch production. To alleviate the impasse, one needs to fabricate the body in a continuous fashion.

The HTS material utilized in the present invention may also be prepared by the continuous melt-texturing process of application Ser. No. 701,677, filed May 16, 1991 by C. W. Chu et. al, and herein incorporated by reference. That process is one which continuously produces a 123 HTS compound body of desired dimensions which is in the form dictated by the application for which such body is particularly intended.

The continuous melt-texturing process of Chu et al. produces bodies composed of a 123 HTS compound in a rod/wire/ribbon/film/plate body form of any desired dimensions. These bodies of 123 compound are dense, of low micro-crack content, low in nonsuperconducting impurity content, and of highly aligned "ab" planes with low angle grain boundaries—i.e., of oriented grain growth; so that such 123 HTS compound bodies have the $J_c$ and total current carrying capacity required for the application for which such body shape is most suited.

EXAMPLES

The following examples are provided merely to illustrate the invention and are not intended to limit the scope of the claims of the invention in any manner.

Example 1

Figure 8:
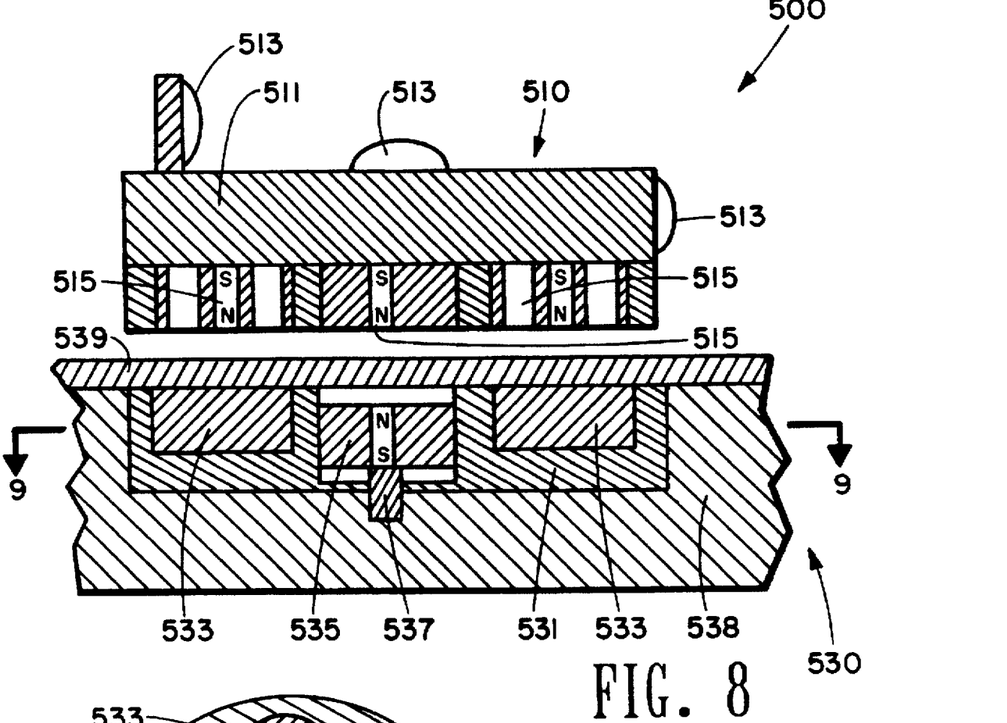
FIG. 8 is a schematic representation of experimental apparatus 500 for Example 1, including isolated platform 510 levitated above HTS/magnet member 530.
Figure 9:
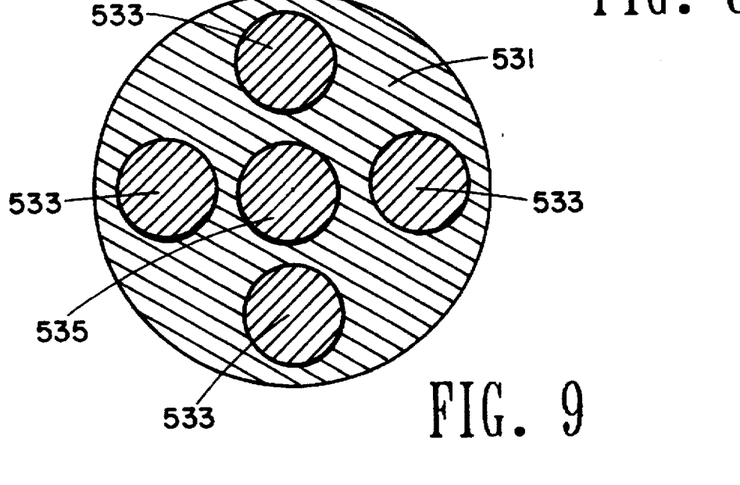
FIG. 9 is a view of experimental apparatus 500 of FIG. 8, taken at 8—8.

This example determines how much transmission of vibration via the magnetic flux linking a magnet and a superconductor is present when the superconductor platform is vibrated. Referring now to FIG. 8, there is shown a schematic representation of experimental apparatus 500, including isolated platform 510 levitated above HTS/magnet member 530. Isolated platform 510 includes support member 511, spherical mirrors 513, and magnets 515. HTS/magnet member 530 includes support member 531, HTS members 533, and magnet 535. Adjustment 537, is a set screw which allows the vertical position of magnet 535 to be varied. HTS/magnet member 530 resides in liquid nitrogen bath 538. A non-magnetic stainless steel substrate 539 is placed over liquid nitrogen bath 538 to held insulate and retain the liquid nitrogen. FIG. 9 is a top view of HTS/magnet member 530 of FIG. 8, taken at 9—9.

Figure 10:
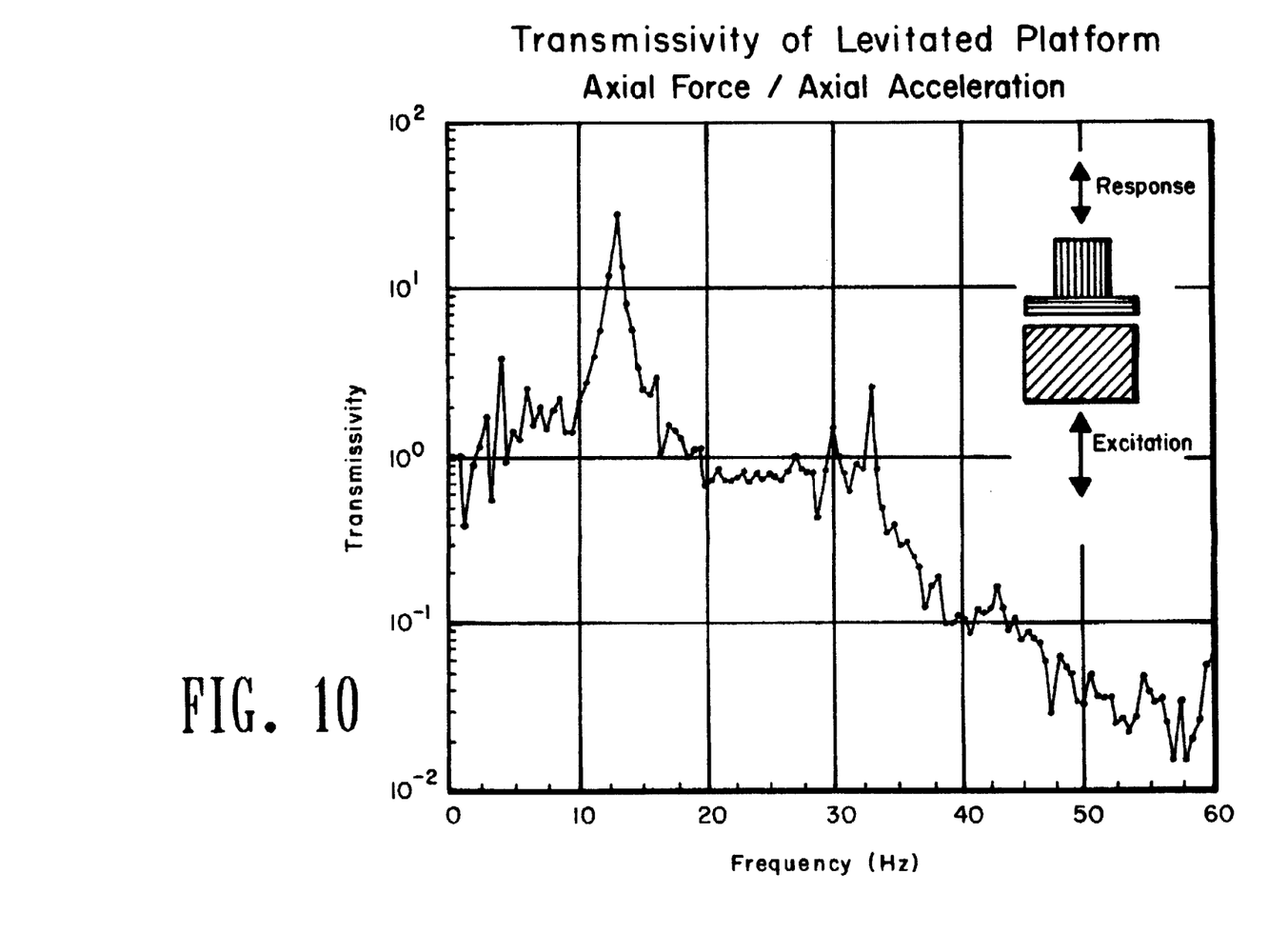
FIGS. 10 and 11 are graphs of data for Example 1, presented as Transmissivity vs. Frequency.
Figure 11:
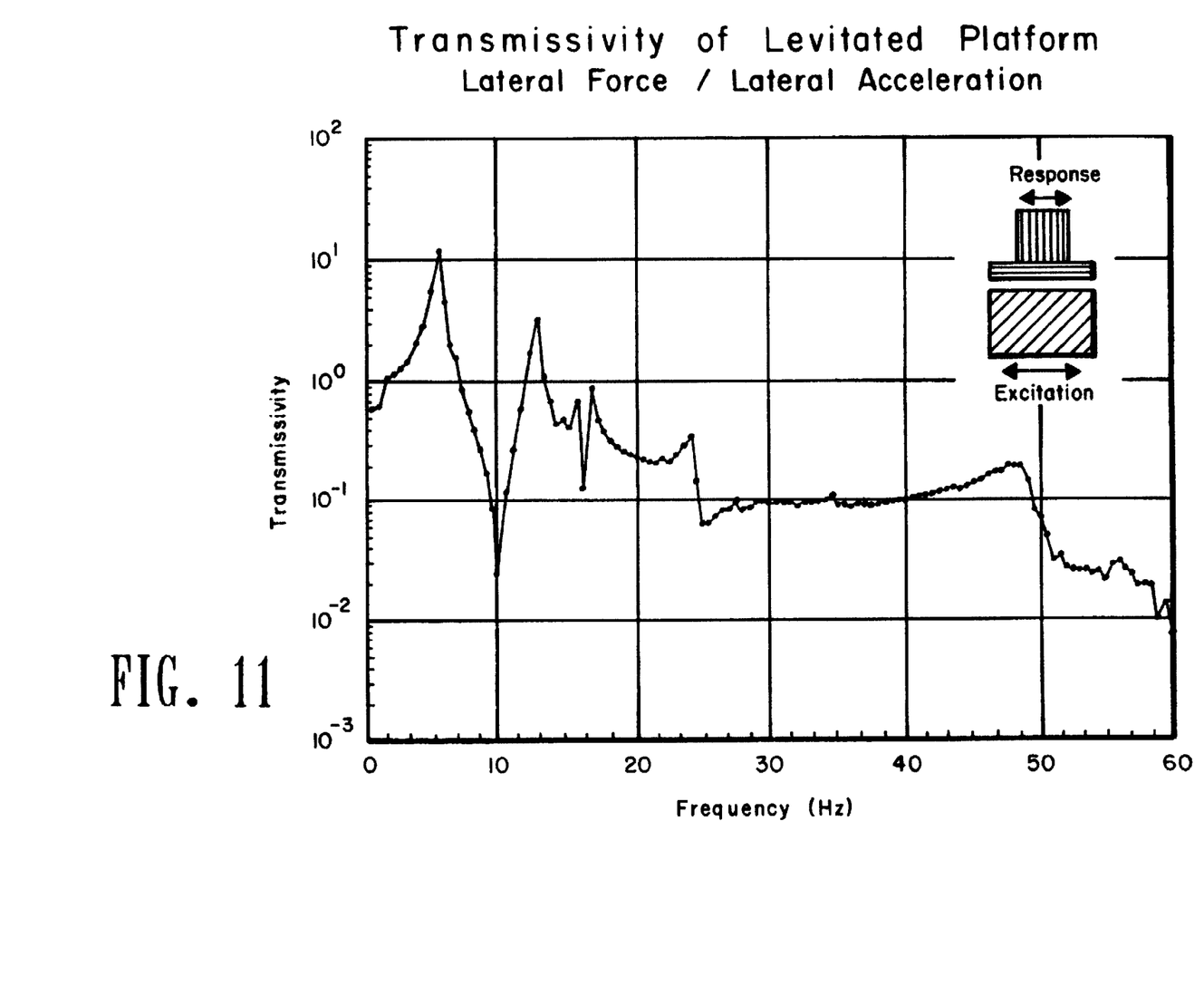

Axial and lateral forces at frequencies up to 60 Hz were applied to HTS/magnet member 530. Results are presented in FIGS. 10 and 11, which both present the data as Transmissivity vs. Frequency. From the data, vibrations are suppressed (by a factor of 100) at high frequencies, but not at low frequencies. The transmission of vibrations for the axial force peaks at about 12 hz, and for the lateral force at about 5 hz.

Example 2

Figure 12:
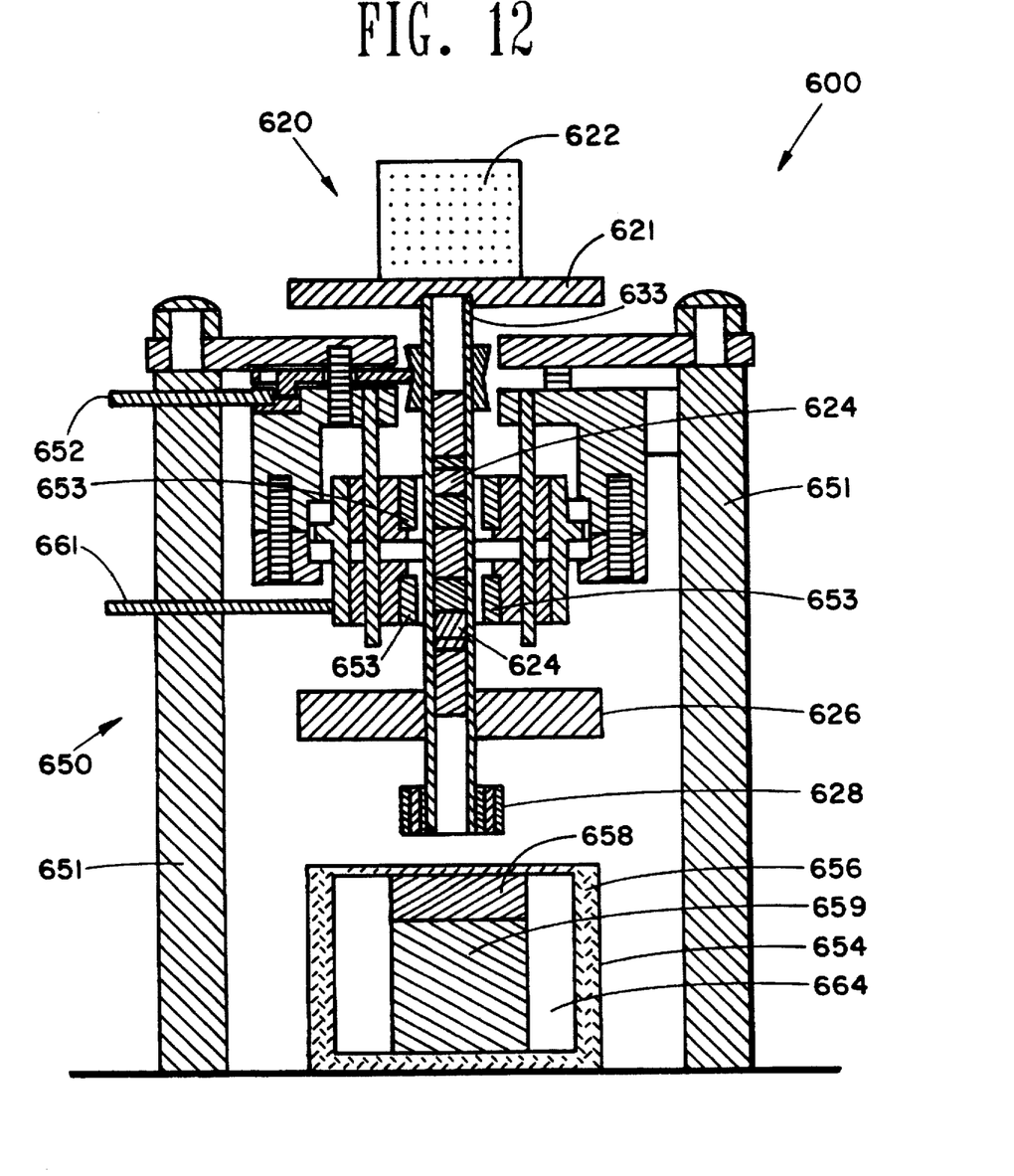
FIG. 12 is a schematic of experimental apparatus 600 for Example 2, including levitated member 620 and grounded member 650.

This example determines how much transmission of vibration in a system with zero (diagonal) translational and rotational (diagonal) stiffness. Referring now to FIG. 12, there is shown experimental apparatus 600 including levitated member 620 and grounded member 650.

Levitated member 620 includes levitated stage 621 supporting accelerator box 622. Support rod 633 includes levitated magnets 624, HTS stability magnet 628, and a counterweight 626.

Grounded member 650 includes framing 651, engager 652, grounded magnets 653, cold stage 654 and weight adjustment 661. Cold stage 654 includes container 656 filled with liquid nitrogen 664, and further housing HTS member 658 and support 659. Engager 652 is utilized until HTS member is sufficiently cooled, at which time it is released.

Figure 13:
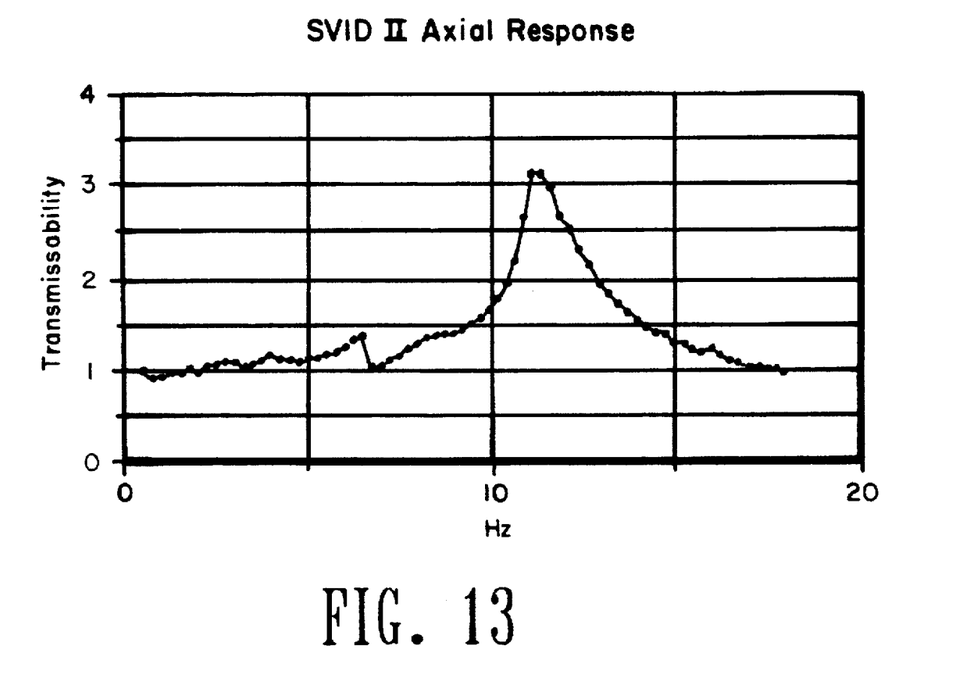
FIG. 13 is a graphs of data for Example 2, presented as Transmissivity vs. Frequency.

Axial and lateral forces at frequencies up to 18 Hz were applied to the superconductor platform. Results are presented in FIG. 13 as Transmissivity vs. Frequency. The transmission of vibrations for the axial force still peaks at about 12 hz.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. An isolation system for isolating a first object from vibrations from a second object, wherein the vibrations comprise three orthogonal components, a first orthogonal component oriented along a first line between the objects, and second and third orthogonal components oriented along second and third lines 90° apart in a plane normal to the first line; the system comprises:

(a) a first stage comprising a first stage magnet member and a first stage superconductor member, wherein the first stage magnet member comprises a magnet, the first stage superconductor member comprises a magnet and superconductor, wherein the first stage magnet member and the first stage superconductor member are disjoined, magnetically interact, and are magnetically biased to move freely relative to each other only parallel to the line of the first orthogonal component;

(b) a second stage comprising a second stage magnet member and a second stage superconductor member, wherein the second stage magnet member comprises a magnet, the second stage superconductor member comprises a magnet and superconductor, wherein the second stage magnet member and the second stage superconductor member are disjoined, magnetically interact, and are magnetically biased to move freely relative to each other only parallel to the line of the second orthogonal component; and (c) a third stage comprising a third stage magnet member and a third stage superconductor member, wherein the third stage magnet member comprises a magnet, the third stage superconductor member comprises a magnet and superconductor, wherein the third stage magnet member and the third stage superconductor member are disjoined, magnetically interact, and are magnetically biased to move freely relative to each other only parallel to the line of the third orthogonal component;

wherein one of the first stage, second stage or third stage is selected as the first object connector to be connected to the first object by the magnet member or superconductor member of the stage;

wherein one of the first stage, second stage or third stage, which one is not selected as the first object connector, is selected as the second object connector to be connected to the second object by the magnet member or superconductor member of the stage;

wherein one of the first stage, second stage or third stage, which one is not selected as the first object connector or the second object connector, is selected as the intermediate stage; wherein the magnet member or superconductor member of the intermediate stage is connected to the first object connector magnet member or the superconductor member not connected to the first object; and wherein the intermediate stage magnet member or superconductor member which is not connected to the first object connector is connected to the second object connector magnet member or the superconductor member which is not connected to the second object.

2. The system of claim 1 wherein for at least one stage of the first stage, second stage or third stage, the magnet member comprises a plurality of magnets oriented such that their north-south pole axis are parallel.

3. The system of claim 2 wherein the plurality of magnets for the at least one stage is positioned around the superconductor member for that stage.

4. The system of claim 3 wherein for the at least one stage, the superconductor member magnet is oriented such that its north-south pole axis is parallel to the plurality of magnets.

* * * * *